United States Patent
Holland

[15] 3,685,528
[45] Aug. 22, 1972

[54] TANK VENT
[72] Inventor: Joseph L. Holland, Indianapolis, Ind.
[73] Assignee: General Motors Corporation, Detroit, Mich.
[22] Filed: Oct. 27, 1971
[21] Appl. No.: 193,074

Related U.S. Application Data

[63] Continuation of Ser. No. 39,703, May 22, 1970, abandoned.

[52] U.S. Cl. ................................................137/43
[51] Int. Cl. ..........................................F16k 17/36
[58] Field of Search....................................137/43

[56] References Cited

UNITED STATES PATENTS 2,942,611   6/1960   Klank, Jr. et al. ............137/43

*Primary Examiner*—Robert G. Nilson
*Attorney*—Jean L. Carpenter, et al.

[57] ABSTRACT

A tank vent arrangement for use with a liquid container positionable in various attitudes, as when used in an aircraft, in which a vent valve having multiple valve seats in a single ball valve is utilized.

4 Claims, 5 Drawing Figures

Patented Aug. 22, 1972

3,685,528

INVENTOR.
Joseph L. Holland
BY
Arthur N. Krein
ATTORNEY

TANK VENT

This application is a continuation of United States patent application Ser. No. 39,703, filed May 22, 1970.

The invention herein described was made in the course of work under a contract or subcontract thereunder with the Department of Defense.

This invention relates to a tank vent arrangement for a liquid-filled tank and, in particular, to a venting system for an engine lubricating oil tank which is operative in all attitudes of the engine.

In order to prevent excessive pressure variation in a liquid-filled tank as it is emptied and refilled, it is common practice to vent the tank to the atmosphere. In the case of a lubricating oil reservoir or oil tank for an engine, it is common practice to vent the oil tank to some portion of the engine as, for example, to the engine gear box. In these vent systems, the vent opening is normally positioned at or near the top of the tank above the normal liquid level to prevent the liquid from escaping or blocking the vent opening. For tiltable tanks, such a single vent system is not practicable for obvious reasons and, in lieu thereof, multiple vents closable by suitable check valves are normally used to effect venting of a tiltable tank.

Accordingly, a primary object of this invention is to improve tank vent arrangements for a tiltable tank whereby a single vent valve is used to effect venting of a liquid-filled tank operative in all attitudes of the tank.

Another object of this invention is to improve a vent system for a tiltable tank by providing for the use of a single ball check valve element to accomplish proper venting of the oil tank at various attitudes of the tank.

These and other objects of the invention are obtained by means of a vent structure for an aircraft engine oil tank in which a vent valve is rigidly secured within the oil tank for movement therewith, the vent valve having multiple vent openings, multiple vent discharge openings and multiple valve seats and a single ball check valve element therein.

For a better understanding of the invention, as well as other objects and further features thereof, reference is had to the following detailed description of the invention to be read in connection with the accompanying drawings, wherein.

Figure 1:
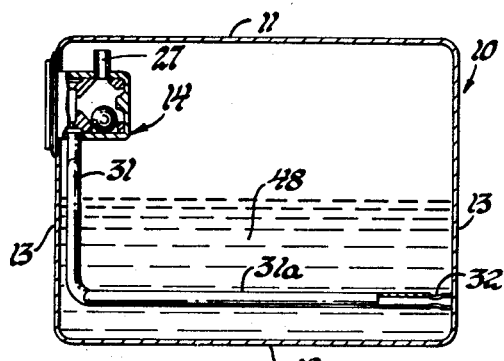
FIG. 1 is a view of an engine oil tank utilizing a tank vent arrangement in accordance with the invention, parts being broken away to show details of its construction, the tank and valve being illustrated in level flight operation.

Referring now to the drawings, there is shown a liquid-filled tank, such as a lubricating oil tank for an aircraft engine, not shown, the tank 10 being formed with top wall 11, bottom wall 12 and side walls 13. A tank vent valve, generally designated 14, constructed in accordance with the invention is rigidly secured to the tank for movement therewith. In the embodiment disclosed, the tank vent valve is mounted within the tank, a suitable aperture 15 being provided in one of the walls of the tank, in the left side wall 13, as seen in FIG. 1, to receive the tank vent valve so that it is positioned within the oil tank, preferably, positioned adjacent to the top and to one side or corner of the oil tank.

Figure 5:
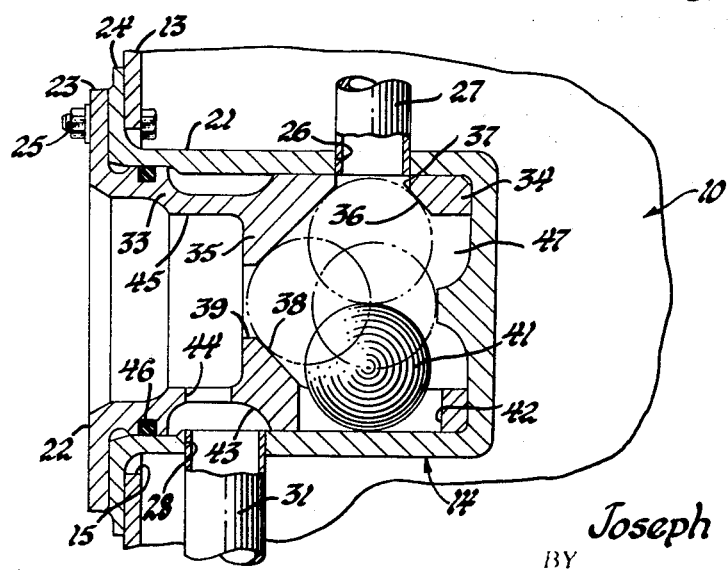

Referring now to FIG. 5, the tank vent valve 14 includes a flanged open end valve housing 21 in which is positioned a valve seat and port unit 22 having an annular flange 23 overlying the flange 24 of the valve housing 21 whereby these two elements are secured together to the tank as by suitable fasteners 25 extending through apertures provided in these flanges and in the side walls of the oil tank.

Valve housing 21 is provided with an aperture 26 to receive one end of vertical vent tube 27 secured therein and a bottom aperture 28 to receive one end of bottom vent tube 31 suitably secured therein. The vertical vent tube 27 has its upper end terminating closely adjacent to the top wall 11 to provide a top inlet vent passage while the bottom vent tube extends downward toward the bottom of the tank, as seen in FIG. 1 with a lateral extension 31a thereof extending across the bottom of the oil tank so that the openings 32 in the side wall of this tube are positioned diagonally opposite from the position of the tank vent valve 14.

The valve seat and port unit 22 formed with cylindrical portions 33 and 34 with an annular interconnecting portion 35 therebetween. Cylindrical portion 34 is provided with a valve seat 36 and an aligned radial passage or vent 37 which is positioned for communication with the aperture 26 in the valve housing 21. A second valve seat 38 is formed on the interconnecting portion 35 in alignment with an axial passage or vent port 39 therethrough.

The valve seat and port unit 22 and valve housing 21 thus form a chamber 47 to loosely house a ball 41, the cylinder portion in addition having an enlarged cutout portion or recess 42 to receive the ball 41 when the oil tank is in a level position, as seen in FIGS. 1 and 5. The ball 41 and seats 36 and 38 act as flow check means as described in detail hereinafter.

Cylindrical portion 33 is also provided with an annulus 43 in communication with aperture 28 in the valve housing 21 and, via radial passage 44, with an axial passage 45 formed therein which is in communication with the atmosphere, for example, by being connected to the vented gear box of an engine, not shown. An O-ring 46 positioned in a suitable annular groove in the valve seat and port unit 22 provides a seal between tee valve housing 21 and valve seal and port unit 22 outboard, in terms of the oil tank, from the annulus 43.

As an oil tank for the engine of an aircraft, the oil tank would normally be filled with lubricating oil 48 to a suitable level, as shown. In operation, an oil pump, not shown, would deliver oil from the tank to various parts of the engine for lubrication while a scavenge pump, not shown, returns the oil to the tank. The subject tank vent apparatus, operable during all attitudes of the airplane, maintains substantially uniform pressure equalization in the oil tank as oil is delivered from or into it by the oil pump or scavenge pump.

During level flight of the aircraft, as seen in FIG. 1, the ball 41 is unseated and rests at the bottom of chamber 47 in the recess 42. In this attitude of the aircraft, the oil level is below the tank vent valve structure per se and covers the openings 32 of vent tube 31. Venting of the tank 10 in this position is effected through vent tube 27, chamber 47 and through vent port 39 into passage 45.

Figure 2:
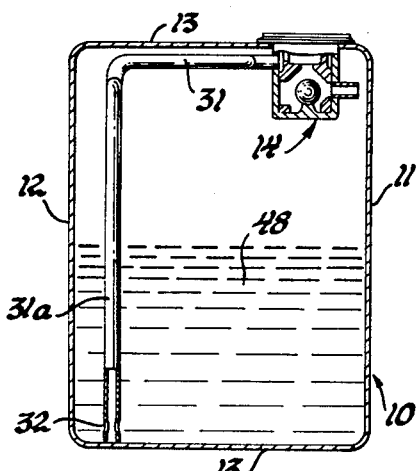
FIG. 2 is a view similar to FIG. 1, illustrating the position of the various elements thereof during nose-up operation.

When the aircraft attains a nose-up attitude, with the tank positioned as seen in FIG. 2, ball 41 is unseated and rests on the rear wall of chamber 47 while the level of oil is below tank vent valve 14 and vent tube 27 permitting venting of the oil tank through tube 27, chamber 47 and through vent port 39 into passage 45.

Figure 3:
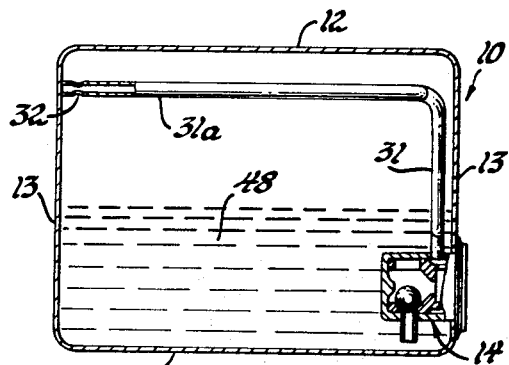
FIG. 3 is a view similar to FIG. 1, illustrating the elements thereof in upside down operation.

During upside down operation of the aircraft, as depicted in FIG. 3, ball 41 seats on seat 36 preventing the flow of oil through vent tube 27 which is now immersed in oil. However, the oil level is then below the vent openings 32 in vent tube 31 and the oil tank can then be vented through the vent openings 32 in vent tube 31, through the annulus 43 and passages 44 and 45.

Figure 4:
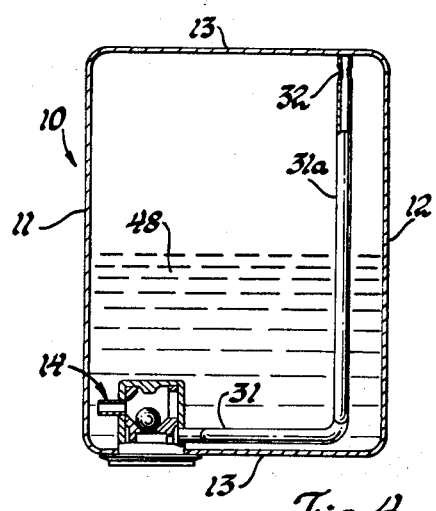
FIG. 4 is a view similar to FIG. 1 illustrating the position of the elements thereof in nose-down operation; and, FIG. 5 is an enlarged sectional view of the vent valve structure of FIG. 1.

When the aircraft is in a nose-down attitude, the oil tank is in the position shown in FIG. 4, with the ball 4 now seated on seat 38 blocking the flow of oil 48 through vent port 39, the vent tube 27 now being immersed in oil. Again the oil level in the tank is below the vent openings 32 in vent tube 31 and the tank is then vented through vent tube 31, annulus 43 and passages 44 and 45.

With the vent arrangement of the invention, the oil tank 10 is vented at all times irrespective of the pitch or roll attitude of the tank since, with reference to FIG. 1, the top-inlet vent opening and the bottom-inlet vent opening, defined by the top opening in vent tube 27 and the vent openings 32 in vent tube 31, respectively, are located at the top and bottom of the tank and diagonally opposite each other at opposite ends and sides of the oil tank.

What is claimed is:

1. A tank vent apparatus for use with a tank partly filled with liquid, the tank being movable to various attitudes and having an aperture in a corner side wall adjacent to the normal top of the tank, said tank vent apparatus consisting of a valve housing means having annular flange means connectable to the outer surface of the tank with the remainder of the valve housing means extending through said aperture into the tank, said valve housing means defining a chamber and an axial passage adapted to be in communication with the atmosphere, a vent port in said valve housing means adjacent one end of said axial passage for placing said chamber in communication with said axial passage, the other end of said axial passage extending through said annular flange means, top vent passage means in communication with the top of said chamber and including a top vent inlet adapted to be positioned inside the tank near the top and one corner thereof above said valve housing means, a bottom vent passage means in said valve housing means extending in the opposite direction of said top vent passage in communication with said axial passage adjacent said vent port, said bottom vent passage means including a bottom vent inlet means adapted to be positioned inside the tank near the bottom thereof in a corner opposite said valve housing means, the walls of said chamber forming valve seats therein adjacent to said top vent passage means and said vent port, and a ball loosely disposed in said chamber capable of being moved by gravity into seating engagement with said seats to block the flow of liquid through said top vent passage means and through said vent port as determined by the attitude of the tank.

2. A tank vent apparatus connected to a liquid containing tank movable to various attitudes, said tank having an aperture in a side wall thereof adjacent to one corner of the tank and adjacent to the normal top of the tank, said tank vent apparatus consisting of valve housing means having annular flange means connected to the outside of the tank with the remainder of said valve housing means extending into the tank through said aperture, said valve housing means defining a chamber and an axial passage in communication with each other by a port, said port being adjacent to one end of said axial passage, the opposite end of said axial passage extending through said annular flange means to the exterior of said tank, a top vent passage means in said valve housing means in communication with said chamber, said top vent passage means including a top vent tube in the tank having one end thereof positioned closely adjacent to the top and a side of the tank above said valve housing means to provide a top vent, a bottom vent passage means opposite said top vent passage means in communication with said axial passage and bypassing said chamber, said bottom vent passage means including a bottom vent tube having one end thereof in the tank positioned near the bottom thereof and diagonally opposite said top vent tube, and means loosely disposed in said chamber capable of selectively sealing said port and said top vent passage means when the tank is moved to a position whereby said means will move by gravity selectively into closing relationship relative to said port and said top vent passage means.

3. A tank vent apparatus according to claim 2 wherein said means loosely disposed in said chamber comprises a ball.

4. A tank vent apparatus according to claim 3 wherein said valve housing means includes angularly inclined surfaces forming said chamber, said angularly inclined surfaces being adjacent to said port and to said top vent passage to provide a pair of seats for said ball.

* * * * *